United States Patent Office.

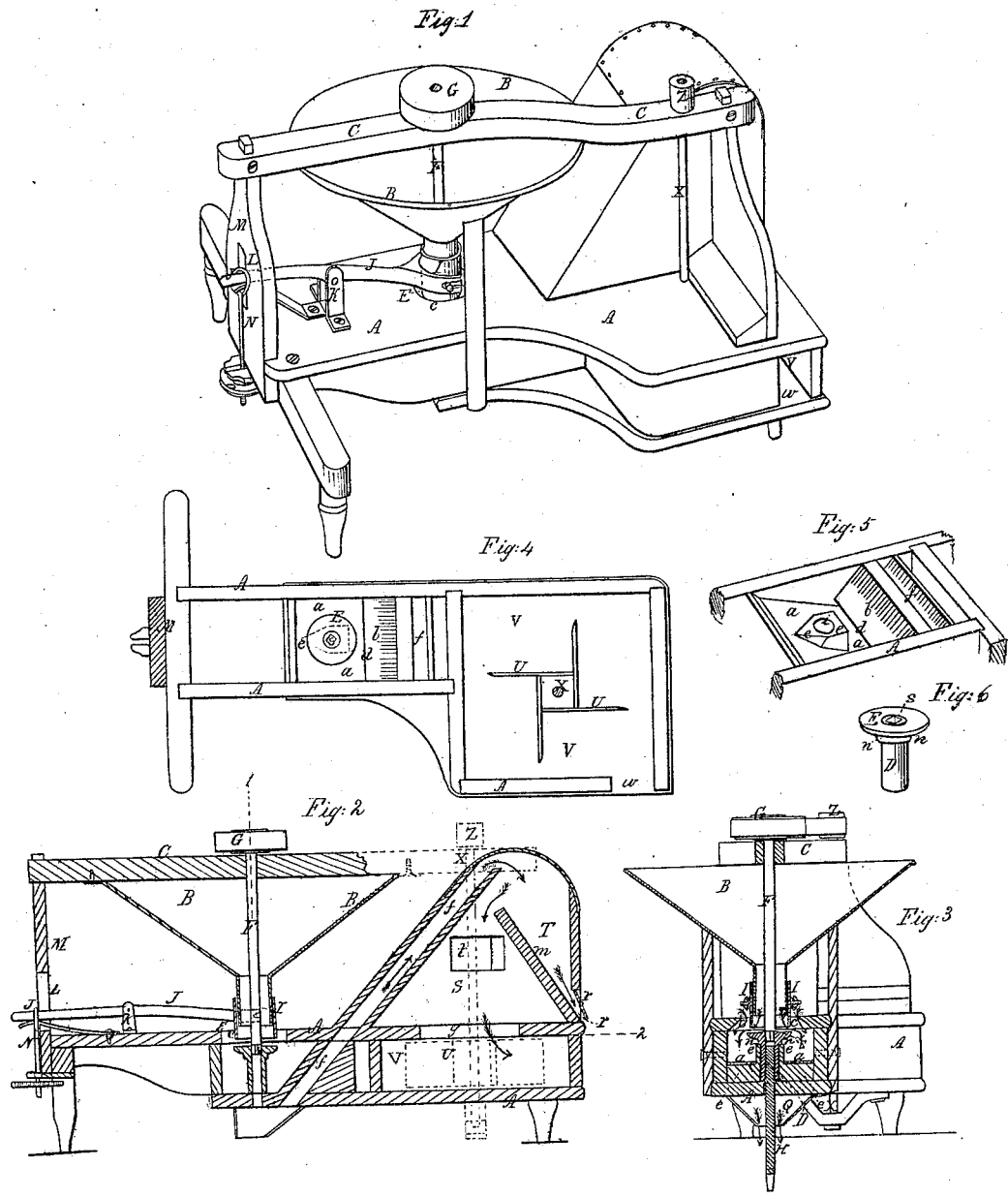

MICHAEL DE CAMP, OF SOUTH BEND, INDIANA.

*Letters Patent No. 63,786, dated April 16, 1867.*

IMPROVED MILLSTONE FEED.

*The Schedule referred to in these Letters Patent and making part of the same.*

TO ALL WHOM IT MAY CONCERN:

Be it known that I, MICHAEL DE CAMP, of South Bend, in the county of St. Joseph, and State of Indiana, have invented certain new and useful Improvements in Machines for Cleaning and Feeding Grain into the Eye of a Millstone, of which the following is a full, clear, and exact description, reference being had to the accompanying drawings of the same, which make part of this specification, and in which—

Figure 1 represents a view in perspective of a machine embracing my improvements.

Figure 2 represents a vertical longitudinal section through the centre of the machine.

Figure 3 represents a vertical transverse section at the line 1 1 of fig. 2.

Figure 4 represents a horizontal section at the line 2 2 of fig. 2.

Figure 5 represents a view in perspective of the chamber of the revolving feeder, with the latter removed; and Figure 6 represents a view in perspective of the revolving feeder removed from its chamber.

My improvements relate to feeding grain into the eye of a millstone, and in separating from the grain, during the process of feeding, the impurities therefrom by a suction blast, and subsequently separating the cheat, cockle, and light grain from the blast, dust, and fine dirt, and thereby save all that is valuable in the matter separated by the blast. I am aware that a blast or suction spout has been applied to grain feeders of millstones, but in such applications the cheat, cockle, and light grain are carried away with the dust and blast, and lost.

In the accompanying drawings, A represents the frame of the feeding and separating apparatus, the left portion of which contains the feeding chamber, and forms, as it were, the neck to the enlarged fan case of the separator at the right. The feeding chamber is of a V-shape in its vertical section longitudinally, having an inclined bottom, $a$, which is overhung by an inclined board, $b$, so as to form an opening, $d$, and having also an opening, $c$, in the top of the chamber sufficiently large to admit of the reception of the end of the feeding-tube of the grain hopper and leave an annular space round it for the admission of air, while the opening $d$ is for the passage of the grain. The grain hopper B is suspended from a top rail, C, of the frame, so that its lower tubular portion is centrally within the opening $c$ of the feeding chamber. Within this chamber and centrally beneath the hopper, a block of hard wood, $e$, is secured to the frame and projects above the inclined bottom $a$, having a cylindrical opening, $i$, fig. 5, to receive and support the cylindrical shank of the feeder. The end of the block within the chamber is made conical so as not to impede the descent of the grain on the bottom $a$. The feeder consists of a short cylindrical tube or shank, D, having a disk or plate, E, of suitable diameter formed upon its upper end, upon which the grain in the tube of the hopper is supported, and from which it is distributed into the chamber. The lower end of the tube of this feeder rests upon the bottom of the case, while an annular shoulder, $n$, figs. 2, 3, and 6, beneath the disk, rests upon the top of the block $e$, and thus the feeder is seated and supported both vertically and laterally so as to insure a perfectly steady motion. An opening, $u$, is made in the side of the seat to admit air and oil to the shank D. The central opening $s$ of the feeder is square and receives the lower correspondingly shaped end of a vertical shaft, F, located centrally in the hopper, and with its upper end supported in bearings in the top rail C, and carrying a pulley, G. The central shaft F is driven by its square end and in turn drives the feeder, and the square opening $s$ in the shank D of the feeder receives the damsel H, the stem of which is square and fits into the opening $s$, whilst its lower end is secured to cross-bars in the eye of the millstone in the usual manner. This method of constructing the damsel and feeder in two separate parts, and connecting them together in such a manner as to form an adjustable or elongating damsel, is of very material importance and advantage in adapting the feeder to any irregularity in the motion of the millstone, or to the damsel bars of millstones of varying thickness, for the machine is portable and may be shifted from one millstone to another, and the damsel is at all times self-adjusting and accommodates itself free of the feeder to the conditions stated, thus rendering its construction convenient and facilitating its application to the eye of the millstone. Directly above the feeder I arrange a regulating tube, I, so as to enclose the end of the hopper tube, and consequently concentric with it, and of a diameter less than the diameter of the feeding disk, so that the latter projects beyond the circumference of the regulating tube. This tube extends into the opening $c$ of the feeding chamber, and is pivoted to the end of a lever, J, by which it is suspended. This lever has its fulcrum in a stud, K, on the frame, and its opposite end passes through a guide slot, L, in a vertical post, M, and is connected to an adjusting rod, N, having a milled screw nut, P, on its lower end, beneath a holding arm by which the outer end of the lever is raised and lowered, so as to elevate and depress the regulating tube I, and thereby increase or diminish the space between the top of the revolving disk E and the annular edge of the tube I, and in this manner the grain is fed faster or slower on to the revolving disk, for in proportion to the space between the fixed tube I and the revolving disk, so will be the quantity of grain fed out of this annular opening. The shaft F passes centrally through the hopper and regulating valve I, and by its revolving serves to stir and keep the grain from binding or choking in the hopper tube, while the disk revolving rapidly insures a free and easy passage of the grain. The disk or silent feeder, it will be observed, is perfectly flat, and the grain resting upon it in the valve is thrown by centrifugal action horizontally in a thin sheet from the edge of the disk, and is therefore more uniformly diffused in the chamber before it falls to the bottom $a$, and is hence in a better condition to be separated from the light impurities by the wind passing through it than could possibly be effected when the grain is thrown downward as is the case with the conical silent feeders now in use. A spout, Q, secured beneath the exit opening $d$ in the feeding chamber, conducts the grain into the eye of the millstone, and has an opening, $v$, for the admission of air. In order to separate the impurities from the grain before it reaches the eye of the millstone, I combine a peculiarly constructed separator with the feeding apparatus, consisting of a case in which are arranged a series of compartments above the feeding apparatus, and communicating with its exit opening $d$ by means of an air passage, $f$, inclining upward and outward therefrom at an angle of about forty-five degrees, and emptying into two compartments, S and T, beneath which is arranged the suction fan U, in a compartment on a level with the feeding apparatus. The fan is supported by a shaft, X, having its bearings in the top rail C, and a step beneath the fan case, and is driven by a small pulley, Z, on the upper end of said shaft, round which a band leads to the larger pulley G on the hopper shaft F, so that the motion of the fan shall be much greater than that of the revolving disk feeder. The fan case has an opening, $g$, at its top through which the air is drawn, and the compartments S and T above are formed by an inclined partition, $m$, extending from an opening, $r$, at the rear side of the case to near the top of the air passage $f$, as shown in fig. 2, so as to form a compartment, T, for the cleanings, and one, S, through which the blast, dust, fine dirt, and chaff pass. The rear opening $r$ is provided with a valve so as to allow the cleanings to pass out according as the draught is increased or diminished, and the compartment S is provided with an opening, $t$, and slide valve to increase or diminish at pleasure the draught of the fan. In the separation of the pure from the impurities in the grain, it is always desirable to save such of the impurities as the cheat and cockle, because there is mixed with it in being separated more or less of light and broken grain which is valuable, and whose specific gravity is about equal to that of the impurities mentioned. To accomplish this, therefore, I have constructed and arranged the separator so as to separate all the impurities from the grain by combining with the feeding apparatus an air-suction passage, $f$, and combining with this inclined passage two other compartments—one, T, for the reception of the light grain, cheat, and cockle, where it is directed into a receiver and preserved, and the other, S, to receive and direct the suction blast of dust, dirt, and chaff into and through the fan case and out of the opening $w$ in the side thereof. The shaft F may be driven in any suitable manner, but is usually driven with the runner stone. It is obvious that the damsel might be made in one piece, in which case the square portion of the damsel would be sufficiently long to admit of the self-adjustment referred to, but I prefer to make it in two parts as shown, as greater facilities and advantages result from such construction.

In the operation of grinding grain into flour the miller experiences considerable inconvenience from the passage between the stones of inferior grain along with grain of the first quality. The cause of this is that grain, although it may have been properly treated with a fanning mill on the farm, becomes shrunken, light, and rotten during its transit, and storage in warehouses, and from other causes. Again grain becomes dirty, and often is found mixed with chaff, small seeds, and other foreign substances after it has been subjected to a fanning operation. To place grain, which is in the condition just mentioned when the miller receives it from the merchant or farmer, under the control of a blasting and separating device applied directly to the eye of the millstone, and immediately between the feeder and the grinder, is the object or design of my invention. Hence I call my invention a combined feeder and separator for millstones, such a combination never to my knowledge having been made; but a simple blast or suction spout, which does not separate the different impure substances after they are drawn away from the good grain in its descent between the grinding surfaces, may have been devised or used.

What I claim, and desire to secure by Letters Patent, is—

1. The separator constructed and operating substantially in the manner herein described, and applied in the relation substantially as shown and described to the millstone feeder and the eye of millstones, for the purpose set forth.

2. The construction of the mouth of the separator in the manner substantially as shown and described, so that the separator is adapted to be applied to a mill, and to operate substantially as described for the purpose set forth.

3. The arrangement of a millstone feeder and a separator in the relation to one another substantially as shown and described and for the purpose set forth.

4. The raised step $e\ e\ i$, arranged on an inclined support and in relation to the inclined partition $b$ and the passage $d$, substantially as and for the purpose described.

Witness my hand in matter of my application for a patent for improvement in machines for cleaning and feeding grain into the eye of a millstone.

MICHAEL DE CAMP.

Witnesses:
L. T. STEDMAN,
WM. H. STANFIELD.